US012681146B2

(12) United States Patent
Jagannath et al.

(10) Patent No.: US 12,681,146 B2
(45) Date of Patent: Jul. 14, 2026

(54) SIGNAL INTELLIGENCE SYSTEM TO INTEGRATE SPECTRUM PREDICTION WITH EMITTER CLASSIFICATION AND PNT

(71) Applicant: Andro Computational Solutions, LLC, Rome, NY (US)

(72) Inventors: Jithin Jagannath, Oriskany, NY (US); Anu Jagannath, Oriskany, NY (US); Andrew Louis Drozd, Rome, NY (US)

(73) Assignee: Andro Computational Solutions, Rome, NY (US)

( * ) Notice: Subject to any disclaimer, the term of this patent is extended or adjusted under 35 U.S.C. 154(b) by 349 days.

(21) Appl. No.: 18/499,624

(22) Filed: Nov. 1, 2023

(65) Prior Publication Data

US 2024/0151816 A1      May 9, 2024

Related U.S. Application Data

(60) Provisional application No. 63/382,167, filed on Nov. 3, 2022.

(51) Int. Cl.
*G01S 7/41*          (2006.01)
(52) U.S. Cl.
CPC ................................... *G01S 7/417* (2013.01)

(58) Field of Classification Search
CPC ................................ H04W 24/02; G01S 7/41
See application file for complete search history.

(56) References Cited

U.S. PATENT DOCUMENTS 12,490,288 B2 * 12/2025 Narasimha Swamy . G06N 3/08
2024/0097352 A1 * 3/2024 El-Akkad .............. H01Q 1/247

* cited by examiner

*Primary Examiner* — Michael T Vu
(74) *Attorney, Agent, or Firm* — Hoffman Warnick LLC

(57) ABSTRACT

Embodiments of the disclosure provide a signal intelligence system for integrating radio frequency (RF) spectrum prediction with emitter classification and position, navigation, and timing (PNT). Methods of the disclosure include detecting a signal from an emitter operating within a wireless network. Continued processing includes forecasting, via a multi-task learning component of a machine learning module, one of a signal modulation, an emission protocol, and an identification of the emitter based on the detected signal. Additional processing includes calculating a positioning, navigation, and timing (PNT) profile for the emitter using a recurrent graph neural network (ReGNN) component of the machine learning module. Further processing includes predicting, via a recurrent neural network (RNN) of the machine learning module, a spectrum occupancy of the emitter within the wireless network.

17 Claims, 3 Drawing Sheets

SIGNAL INTELLIGENCE SYSTEM TO INTEGRATE SPECTRUM PREDICTION WITH EMITTER CLASSIFICATION AND PNT

BACKGROUND

1. Technical Field

The present disclosure relates generally to wireless networks. Specifically, embodiments of the disclosure provide a signal intelligence system for integrating radio frequency (RF) spectrum prediction with emitter classification and position, navigation, and timing (PNT).

2. Background Art

With the unprecedented scale of Internet of Things (IoT) devices for entertainment, federal applications, smart home, industrial automation, and other smart connected infrastructure, the relentless demand for the scarce spectrum is increasing. An example of a complex scenario involving communication across wireless networks is tactical signal intelligence (SIGINT). Conventional SIGINT techniques rely upon static (i.e., probabilistic) models for the RF environment that may only operate under certain operational parameters and often require high signal-to-noise (SNR) for accurate estimation. Such solutions thus cannot comprehend communication and radar signals over a wider range and may focus solely on classification. More robust models may be overly specific to particular situations, and thus may not be widely adaptable to changing environments and/or tactical situations. In these and other conventional models, the analytical framework relies upon known signals and cannot detect and/or classify unknown emitters within a network area.

SUMMARY

The illustrative aspects of the present disclosure are designed to solve the problems herein described and/or other problems not discussed.

Aspects of the disclosure provide a method including: detecting a signal from an emitter operating within a wireless network; forecasting, via a multi-task learning component of a machine learning module, at least one of a signal modulation, an emission protocol, and an identification of the emitter based on the detected signal; calculating a positioning, navigation, and timing (PNT) profile for the emitter using a recurrent graph neural network (ReGNN) component of the machine learning module; and predicting, via a recurrent neural network (RNN) of the machine learning module, a spectrum occupancy of the emitter within the wireless network.

Further aspects of the disclosure provide a system including a signal intelligence (SIGINT) system including: a sensor configured to detect a signal from an emitter operating within a wireless network; and a computing device coupled to the sensor and including a machine learning module, wherein the computing device is configured to: forecast, via a multi-task learning component of the machine learning module, one of a signal modulation, an emission protocol, and an identification of the emitter based on the detected signal, calculate at least one of a positioning, navigation, and timing (PNT) profile for the emitter using a recurrent graph neural network (ReGNN) component of the machine learning module, and predict, via a recurrent neural network (RNN) of the machine learning module, a spectrum occupancy of the emitter within the wireless network.

Additional aspects of the disclosure provide system including a wireless network and a plurality of emitters sharing a spectrum of the network, including: a sensor configured to detect a signal from an emitter operating within the wireless network; and a computing device coupled to the sensor and including a machine learning module, wherein the computing device is configured to: forecast, via a multi-task learning component of the machine learning module, one of a signal modulation, an emission protocol, and an identification of the emitter based on the detected signal, calculate at least one of a positioning, navigation, and timing (PNT) profile for the emitter using a recurrent graph neural network (ReGNN) component of the machine learning module, and predict, via a recurrent neural network (RNN) of the machine learning module, a spectrum occupancy of the emitter within the wireless network.

DETAILED DESCRIPTION

Figure 1:
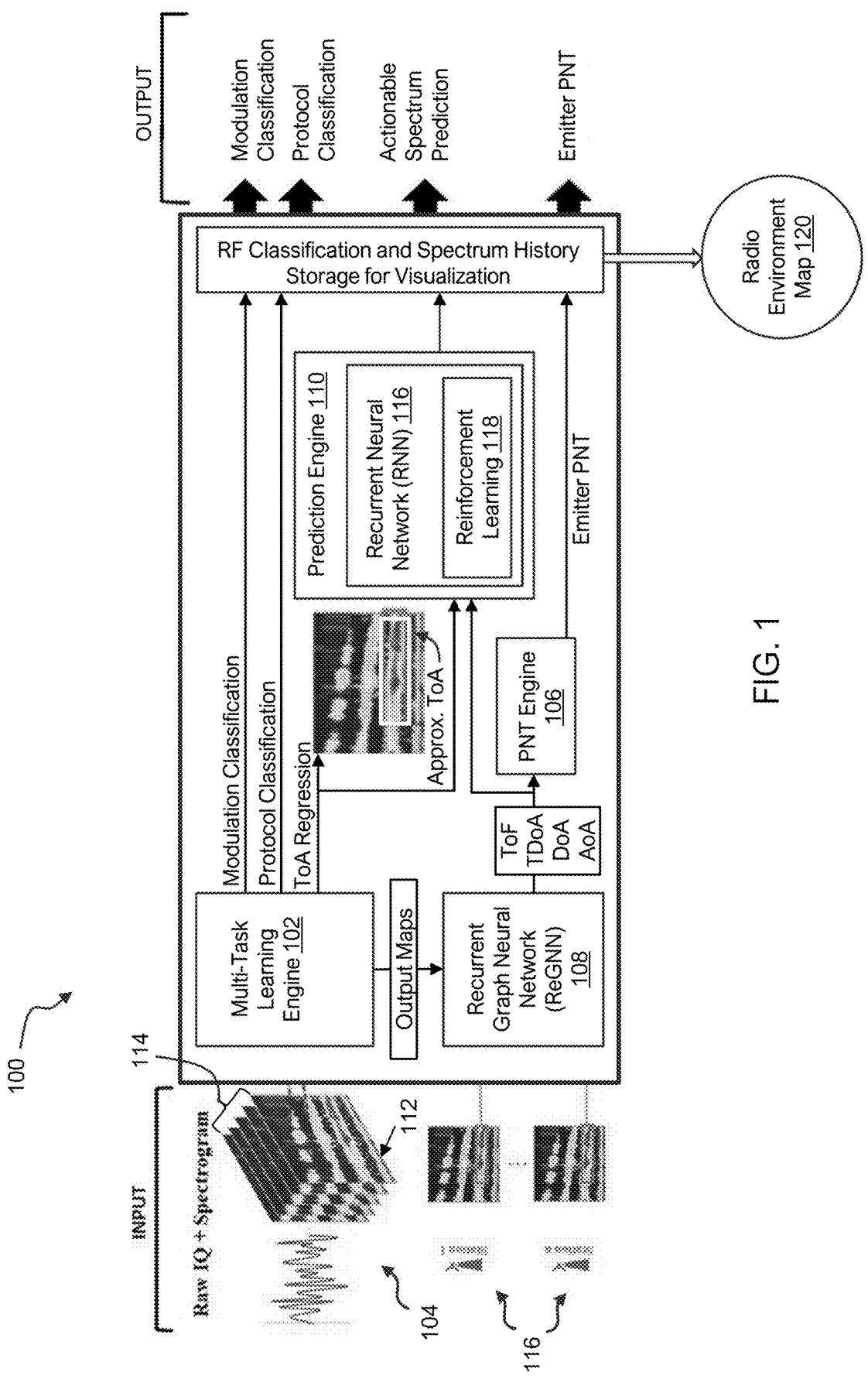
FIG. 1 shows a schematic diagram of a signal intelligence system for integrating spectrum prediction with emitter classification and position, navigation, and timing (PNT) according to embodiments of the disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described to best explain the principles of the disclosure and the practical application, and to enable others of ordinary skill in the art to understand the disclosure for various embodiments with various modifications as are suited to the particular use contemplated.

Embodiments of the disclosure combine various attributes of semi-supervised learning along with reinforcement learning techniques to provide a more robust signal intelligence (SIGINT) network. Embodiments of the disclosure address various challenges and opportunities presented in conventional techniques. For example, conventional algorithms employ static (probabilistic) models for the radio frequency (RF) environment and often require high signal to noise ratio (SNR) for accurate estimation. Machine learning (ML) algorithms, however, provide an accurate estimate for signal parameters from high-dimensional measurements in the presence of model uncertainties. Conventional techniques, in addition, are unable to comprehend a wide range of signals (e.g., communication and radar) and usually focus just on classification. Embodiments of the disclosure aim to provide a precision estimate of position, navigation, and timing (PNT) for a wide range of signals (e.g., wireless signals). Furthermore, an issue with conventional artificial intelligence (AI)-driven approaches may be poor generalization capability. Embodiments of the disclosure, rather than relying on such approaches as a base, are built to inherently generalize and thus provide robust solutions even in the presence of propagation effects such as fading, doppler shifts, multipath delays, etc. Traditional PNT techniques use algorithms specific to known signals, but embodiments of the disclosure instead detect signals with unknown structure (e.g., modulation type, bandwidth, time duration, etc.) and provide an accurate estimate of the PNT for the emitter.

In today's age of growing electronic warfare (EW) threats, superior RF situation awareness is key in gaining a tactical edge. Embodiments of the disclosure address active RF threats by presenting precision PNT, enabling operators/soldiers to act upon the gathered information. Embodiments of the disclosure serve as an early warning system by predicting upcoming EW threats to track as well as accurately geolocate the detected threats with the aid of advanced AI/ML engine.

By accurately identifying the emitter, the wireless protocol of the emitter, corresponding modulation format, emitter location, and emission trend of the emitter, embodiments of the disclosure present a lucid radio environment map which will present operators/soldiers with critical actionable intelligence. Embodiments of the disclosure can be implemented as a software and/or hardware solution deployed on embedded software defined radios (SDR) or other suitable equipment. Embodiments of the disclosure may be hardware agnostic by relying only on raw data and providing a software suite that can be deployed on customers' onsite sensors with an RF frontend.

FIG. 1 depicts a system 100 for integrating RF spectrum prediction with PNT according to embodiments of the disclosure, which may be implemented as a comprehensive AI solution for RF SIGINT. As shown, the system 100 may include a plurality of components. For example, the system 100 may include a multi-task learning (MTL) engine 102 that receives RF input signals 104 (e.g., raw in-phase (I) and quadrature (Q) signals and spectrogram signals) and performs RF modulation, protocol, and emitter classification along with coarse regression of signal parameters. The system 100 additionally may include a PNT engine 106 enabled by a recurrent graph neural network (ReGNN) 108 to perform precision PNT of any unknown emitter(s). The system 100 may further include a prediction engine 110 that provides actionable prediction regarding spectrum occupancy.

Various embodiments of the disclosure are operable to perform multiple RF signal classification tasks with a single neural network model. Since this approach enables multiple representations with a single model, they are adaptable to a wide variety of situations without overfitting. According to embodiments of the disclosure, tasks of the MTL engine 102 may include: 1) modulation classification; 2) wireless protocol classification; 3) emitter classification; and 4) a coarse estimate for the timing and frequency band of a signal source, which is used in the PNT engine 106 to provide an accurate estimate of signal timing and emitter position.

Embodiments of the disclosure provide a methodology for coarse estimation and signal identification. The MTL engine 102 may use a 3D representation of the RF spectrum to provide a coarse estimate for the timing and spectral band of a signal. The raw complex-valued baseband samples of the measured signal are processed by a short-time Fourier transform (STFT) over several time slots. The result of STFT on every time slot is a two-dimensional (2D) data set 112. Aggregation of the 2D spectral amplitude/phase information over multiple time slots constitutes the 3D representation 114 of the spectrum (similar to a video in computer vision).

Every signal source in the environment exhibits a specific trace in the 3D representation 114 of the spectrum provided by the STFT. Even if multiple signals occupy the same frequency band, the times of arrival (ToAs) of different signals is not perfectly synchronous, and thus, easily extendable to scenarios where multiple signals co-exist. The fractional time of 2D spectral representation provides an approximation of the ToAs with a resolution of the sampling period, while a phase (output) map includes information about the ToAs with a substantially higher resolution. A convolutional neural network (may include recurrent components) in the MTL engine 102 may be trained to extract the timing and spectral band of signal sources in the 3D representation 114 of the spectrum.

The PNT engine 106 of the system 100 may employ one or more AI engines for estimating signal parameters and/or tracking emitters. In operation, one or more of the AI engines may provide various features. For instance, the system 100 may include a recurrent graph neural network (ReGNN) 108. An accurate estimate for the time-of-flight (ToF) of signals from emitters and the position of emitters requires measurements at multiple base-stations 116. Extracting the spatial information of the RF spectrum, measured at distributed locations (e.g., multiple base stations 116), is one goal of the ReGNN 108. Graph neural networks (GNN) are powerful in modeling spatial information and interactions of multiple nodes of a network, thus ReGNNs are particularly applicable for precision PNT. The ReGNN 108, where implemented, provides a robust fusion model to estimate the ToF of signals and position of emitters using multiple parameters including time difference of arrival (TDoA), direction-of-arrival (DoA), differential amplitude, angle-of-arrival (AoA), and phase of signals at multiple locations.

The ReGNN 108 may be trained with a semi-supervised learning technique to identify signal sources. Two advantages of semi-supervised learning include, e.g.: an extensive set of available RF measurements, potentially with a large subset of unlabeled data, which can be used in training to achieve superior accuracy in signal identification; and the inclusion of unlabeled data in semi-supervised learning results to improved accuracy compared with pure supervised learning techniques. One purpose of the semi-supervised learning algorithm is to address the issue of measurement uncertainties that significantly reduces the accuracy of classical signal identification techniques. The uncertainties may include, e.g., measurement noise, impairment of signal parameters due to probabilistic behavior of propagation channel, uncertainties in the analog circuitry models that add to the unknown phase variations, and signal variations due to the emitter movement and mechanical vibrations.

Embodiments of the disclosure may also provide adaptive sensor data fusion. Multiple parameters of a signal, such as TDoA, received signal strength (RSS), and phase can be used to estimate the PNT, either as standalone observations or in a generic model (as available with the ReGNN 108) that combines all parameters for a more accurate estimate. Further, using antenna arrays at measurements stations, DoA/AoA information can be obtained. Since antenna array configurations can be adjusted and/or optimized for discrete signal frequencies (as antenna separation matches the wavelength only for specific frequencies), the estimated DoA for different frequency bands might be ambiguous. However, combining the partial information of the DoA with other signal parameters increases accuracy of the PNT estimation. The adversarial learning technique helps the ReGNN 108 learn a reliability metric for one or more parameters and a fusion model that is robust to measurement uncertainties.

Embodiments of the disclosure also provide a predictive model for a radio environment map (REM) 120 over long-term periods of time and spatial domain. The REM 120 may be constructed, for example, by the PNT engine 106 in real-time using the estimated parameters detailed above, and predicted in future time slots by a prediction engine 110 to provide lucid RF spectrum visualization. The AI engine providing the prediction model may be a recurrent neural network (RNN) 116 that provides a temporal model for the RF emissions at different frequency bands over the spatial domain. The temporal model can be used to predict the probability of signal transmission at a future time slot. The prediction engine 116 also learns an estimate for the RF interference in the spatial domain, e.g., via reinforcement learning 118. At every iteration of training, the RNN 116 provides the probability of transmission and the emitter information (type, location, etc.). The optimization objective (a component of reward function) corresponding to the accurate prediction of transmission probability is the cross-entropy between the observations of the MTL engine 102 and the predicted probability. The component of the reward function corresponding to the estimate of the emitter position is obtained from the conditional likelihood of signal parameters (e.g., TDoA, amplitude, phase, etc.) estimated by the PNT engine 106, and hence becomes self-learning. The predictions present actionable intelligence to the operator (human-in-the-loop) or can be fed into a radio control module to perform dynamic radio resource allocation such as frequency switching, transmission power control, etc., for interference mitigation based on the RF spectrum forecast.

Figure 2:
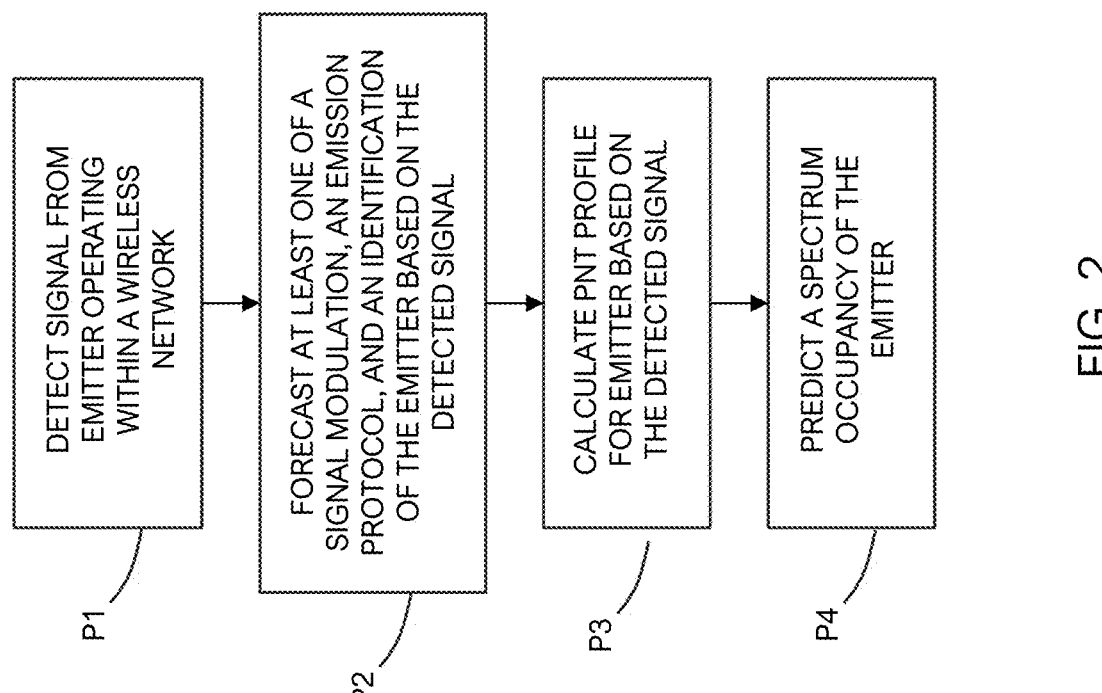
FIG. 2 depicts a flow diagram for a process for integrating spectrum prediction with emitter classification and PNT according to embodiments of the disclosure.

FIG. 2 depicts a flow diagram for a process for integrating spectrum prediction with emitter classification and PNT according to embodiments of the disclosure. At process P1, a signal from an emitter operating within a wireless network is detected. At process P2, at least one of a signal modulation, an emission protocol, and an identification of the emitter is forecasted by the multi-task learning engine 102 based on the detected signal. At process P3, a PNT profile for the emitter is calculated by the ReGNN 108. At process P4, the RNN 116 of the prediction engine 100 predicts a spectrum occupancy of the emitter within the wireless network.

Embodiments of the disclosure provide various technical and commercial advantages, examples of which are discussed herein by integrating spectrum prediction with emitter classification and PNT. The system 100 disclosed herein can successfully identify an emitter together with its wireless protocol, modulation format, location, and/or emission trend. This information can be contextualized and presented in the form of a radio environment map 120, thus reducing the time needed to account for or react to changing circumstances in a mission area. Embodiments of the disclosure, moreover, can be integrated onto conventional SDR hardware together machine learning systems to train and adapt the SIGINT platform for wider varieties of settings and/or contexts.

Figure 3:
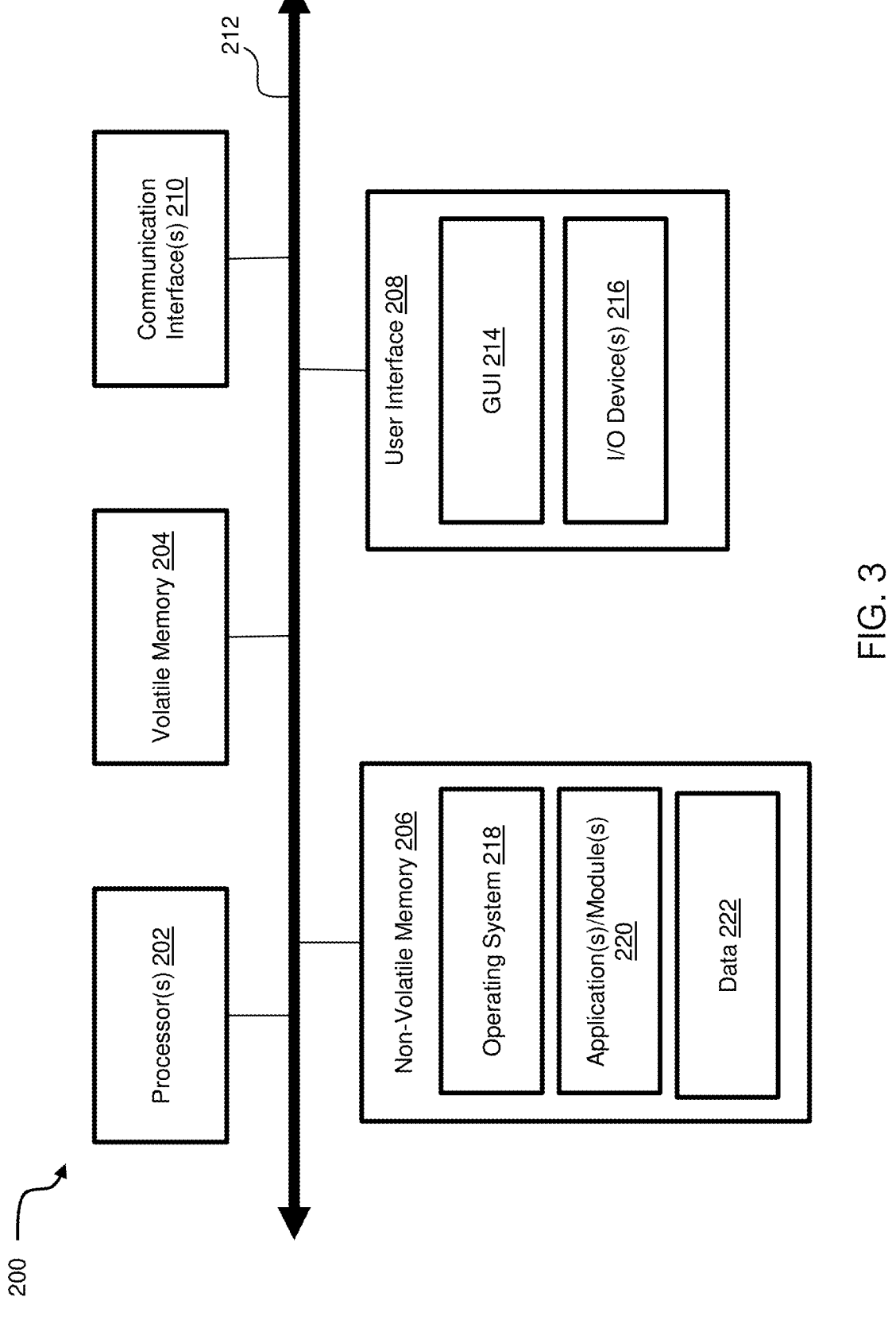
FIG. 3 depicts a computing system according to embodiments of the disclosure.

Turning to FIG. 3, embodiments of the disclosure may be implemented using a computing device/system 200. The computing device 200 may be integrated into an embedded software defined radio, WiFi device, a network base station, and/or other components described herein, or may be an independent device connected to such components.

The computing system 200 may include one or more processors 202, volatile memory 204 (e.g., RAM), non-volatile memory 206 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 208, one or more communications interfaces 210, and communication bus 212. The user interface 208 may include a graphical user interface (GUI) 214 (e.g., a touchscreen, a display, etc.) and one or more input/output (I/O) devices 216 (e.g., a mouse, a keyboard, etc.).

The non-volatile memory 206 stores an operating system 218, one or more applications/modules 220 and data 222 such that, for example, computer instructions of operating system 218 and/or applications 220 are executed by processor(s) 202 out of volatile memory 204. Data 222 may be entered using an input device of GUI 214 or received from I/O device(s) 216. Various elements of computing system 200 may communicate via communication bus 212. The computing system 200 as shown in FIG. 3 is shown merely as an example, as the various components described herein may be implemented by any computing or processing environment and with any type of machine or set of machines that may have suitable hardware and/or software capable of operating as described herein.

The processor(s) 202 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed signal. In some embodiments, the "processor" may be one or more physical processors or one or more "virtual" (e.g., remotely located or "cloud") processors. The communications interfaces 210 may include one or more interfaces to enable the computing system 200 to access a network such as a LAN, a WAN, or the Internet through a variety of wired and/or wireless or cellular connections.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified in at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A method comprising:
detecting a signal from an emitter operating within a wireless network;
forecasting, via a multi-task learning component of a machine learning module, at least one of a signal modulation, an emission protocol, and an identification of the emitter based on the detected signal;
calculating a positioning, navigation, and timing (PNT) profile for the emitter using a recurrent graph neural network (ReGNN) component of the machine learning module, wherein the ReGNN component determines a time-of-flight (ToF) of the signal and a position of the emitter using parameters including at least two of:
a time difference of arrival (TDoA) of the signal,
a direction-of-arrival (DoA) of the signal,
a differential amplitude of the signal,
an angle-of-arrival (AoA) of the signal, and
a phase of the signal; and
predicting, via a recurrent neural network (RNN) of the machine learning module, a spectrum occupancy of the emitter within the wireless network.

2. The method according to claim 1, wherein the signal includes raw in-phase (I) and quadrature (Q) signals and spectrogram signals.

3. The method according to claim 2, further comprising generating the spectrogram signals by:
applying a short-time Fourier transform (STFT) to the I and Q signals over multiple time slots to provide a two-dimensional (2D) data set for each time slot; and
aggregating the 2D data sets for the multiple time slots to generate three-dimensional (3D) spectrogram signals.

4. The method according to claim 1, wherein the parameters are measured at a plurality of different locations.

5. The method according to claim 1, wherein the RNN predicts the spectrum occupancy of the emitter at least partially based on a regression analysis of the detected signal and the PNT profile for the emitter.

6. The method according to claim 5, wherein the radio environment map includes a predictive spectrum occupancy of the emitter in future time slots.

7. The method according to claim 1, further comprising generating a radio environment map in real-time based on the PNT profile for the emitter.

8. A signal intelligence (SIGINT) system comprising:
a sensor configured to detect a signal from an emitter operating within a wireless network; and
a computing device coupled to the sensor and including a machine learning module, wherein the computing device is configured to:
forecast, via a multi-task learning component of the machine learning module, one of a signal modulation, an emission protocol, and an identification of the emitter based on the detected signal,
calculate at least one of a positioning, navigation, and timing (PNT) profile for the emitter using a recurrent graph neural network (ReGNN) component of the machine learning module, wherein the ReGNN determines a time-of-flight (ToF) of the signal and a position of the emitter using parameters including at least two of:
a time difference of arrival (TDoA) of the signal,
a direction-of-arrival (DoA) of the signal,
a differential amplitude of the signal,
an angle-of-arrival (AoA) of the signal, and
a phase of the signal; and
predict, via a recurrent neural network (RNN) of the machine learning module, a spectrum occupancy of the emitter within the wireless network.

9. The system according to claim 8, wherein the signal includes raw in-phase (I) and quadrature (Q) signals and spectrogram signals.

10. The system according to claim 9, wherein the machine learning module is further configured to generate the spectrogram signals by:
applying a short-time Fourier transform (STFT) to the I and Q signals over multiple time slots to provide a two-dimensional (2D) data set for each time slot; and
aggregating the 2D data sets for the multiple time slots to generate three-dimensional (3D) spectrogram signals.

11. The system according to claim 9, wherein the parameters are measured at a plurality of different locations.

12. The system according to claim 8, wherein the RNN is further configured to predict the spectrum occupancy of the emitter at least partially based on a regression analysis of the detected signal and the PNT profile for the emitter.

13. The system according to claim 8, wherein the machine learning module is further configured to generate a radio environment map in real-time based on the PNT profile for the emitter.

14. The system according to claim 13, wherein the radio environment map includes a predictive spectrum occupancy of the emitter in future time slots.

15. A system including a wireless network and a plurality of emitters sharing a spectrum of the network, comprising:
a sensor configured to detect a signal from an emitter operating within the wireless network; and a computing device coupled to the sensor and including a machine learning module, wherein the computing device is configured to:

forecast, via a multi-task learning component of the machine learning module, one of a signal modulation, an emission protocol, and an identification of the emitter based on the detected signal, calculate at least one of a positioning, navigation, and timing (PNT) profile for the emitter using a recurrent graph neural network (ReGNN) component of the machine learning module, wherein the ReGNN component determines a time-of-flight (ToF) of the signal and a position of the emitter using parameters including at least two of:

a time difference of arrival (TDoA) of the signal, a direction-of-arrival (DoA) of the signal, a differential amplitude of the signal, an angle-of-arrival (AoA) of the signal, and a phase of the signal; and predict, via a recurrent neural network (RNN) of the machine learning module, a spectrum occupancy of the emitter within the wireless network.

16. The system according to claim 15, wherein the signal includes raw in-phase (I) and quadrature (Q) signals and spectrogram signals, and wherein the machine learning module is further configured to generate the spectrogram signals by:

applying a short-time Fourier transform (STFT) to the I and Q signals over multiple time slots to provide a two-dimensional (2D) data set for each time slot; and aggregating the 2D data sets for the multiple time slots to generate three-dimensional (3D) spectrogram signals.

17. The system according to claim 15, wherein:

the RNN is further configured to predict the spectrum occupancy of the emitter at least partially based on a regression analysis of the detected signal and the PNT profile for the emitter; and the machine learning module is further configured to generate a radio environment map in real-time based on the PNT profile for the emitter, wherein the radio environment map includes a predictive spectrum occupancy of the emitter in future time slots.

* * * * *